(12) United States Patent  
Horie

(10) Patent No.: US 6,700,855 B2  
(45) Date of Patent: Mar. 2, 2004

(54) OPTICAL DISK DEVICE

(75) Inventor: Kazuyoshi Horie, Tokyo (JP)

(73) Assignee: Sony Corporation, Tokyo (JP)

( * ) Notice: Subject to any disclaimer, the term of this patent is extended or adjusted under 35 U.S.C. 154(b) by 120 days.

(21) Appl. No.: 09/958,716

(22) PCT Filed: Feb. 21, 2001

(86) PCT No.: PCT/JP01/01257

§ 371 (c)(1),  
(2), (4) Date: Mar. 11, 2002

(87) PCT Pub. No.: WO01/61691

PCT Pub. Date: Aug. 23, 2001

(65) Prior Publication Data

US 2002/0136149 A1 Sep. 26, 2002

(30) Foreign Application Priority Data

Feb. 21, 2000 (JP) ........................................ 2000-048982

(51) Int. Cl.[7] .................................................. G11B 7/00
(52) U.S. Cl. .............................. 369/112.21; 369/112.27; 369/110.01; 369/44.23
(58) Field of Search ........................... 369/44.23, 44.11, 369/44.12, 44.14, 44.24, 44.28, 44.27, 44.32, 44.37, 110.01, 110.04, 112.01, 112.05, 112.16, 112.17, 112.21, 112.27

(56) References Cited

U.S. PATENT DOCUMENTS

| 6,034,938 A | * | 3/2000 | Heanue et al. ........... 369/13.56 |
| 6,349,082 B1 | * | 2/2002 | Horie et al. ........... 369/112.21 |
| 6,587,421 B1 | * | 7/2003 | Wilde et al. ........... 369/112.01 |

FOREIGN PATENT DOCUMENTS

| JP | 59-56236 | 3/1984 |
| JP | 61-118121 | 7/1986 |
| JP | 62-259239 | 11/1987 |
| JP | 6-36332 | 2/1994 |
| JP | 7-128073 | 5/1995 |
| JP | 11-162933 | 6/1999 |
| JP | 11-219537 | 8/1999 |

* cited by examiner

Primary Examiner—Muhammad Edun  
(74) Attorney, Agent, or Firm—Sonnenschein, Nath & Rosenthal LLP

(57) ABSTRACT

A light emitted from a light source (11) or a return light from a magneto-optical discs (7a, 7b, 7c or 7d) is transmitted by a polarization maintaining optical fibers (15a, 15b, 15c or 15d). Phase difference generators (16a, 16b, 16c and 16d) are disposed in optical paths, respectively, for these light beams to generate a phase difference which is used to cancel, or multiply by an integer multiple of π, a phase difference between field vibration components, raised in the light due to the birefringence of the polarization maintaining optical fiber (15a, 15b, 15c or 15d) when the light is propagated through the latter.

9 Claims, 16 Drawing Sheets

OPTICAL DISK DEVICE

BACKGROUND OF THE INVENTION

The present invention relates to an optical disc drive which writes and/or reads signals to and/or from an optical disc by radiating a light to the latter, and more particularly to an optical disc drive adapted to transmit a light used to write and/or read signals to and/or from an optical disc through a polarization maintaining optical fiber.

BACKGROUND ART

Heretofore, optical discs such as ROM (read-only memory) type optical discs represented by CD (compact disc) and RAM (random-access memory) type optical discs represented by phase-change disc and magneto-optical disc, have widely been used as recording medium to store information including image, sound, character data, etc.

For such optical discs, it has been actively tried to increase the recording density for an increased storage capacity. Along with this trend, various attempts have been made to adapt the optical disc drives for successful write and/or read of signals to and/or from such higher recording density optical discs.

Recently, it has been proposed to apply the flying head technique already implemented in the hard disc drive to the optical disc drive in order to attain a higher recording density of the optical disc.

In this optical disc drive, an objective lens to converge a light on an optical disc is mounted on a slider to form a head and a light emitted from a light source is guided to the head through an optical fiber. In the optical disc drive, the head is scanned over the optical disc while being floated above the optical disc, and a spot of the light converged by the objective lens is radiated onto the optical disc to write and/or read signals to and/or from the optical disc.

An optical disc drive which writes and/or reads signals to and/or from an optical disc should desirably be compatible with all types of optical discs. However, when a magneto-optical disc is used in an optical disc drive which uses an optical fiber for transmission of a light, there will take place such problems as will be described in the following.

When the magneto-optical disc as a recording medium is used in the optical disc drive since signal detection is effected by the use of the Kerr effect that the polarization axes of the linearly polarized light are rotated under the effect of the magnetic field, it is necessary to transmit the light while keeping the light polarized. However, ordinary optical fibers show a random birefringence caused by a disturbance etc. having taken place during manufacture. Hence, a phase difference will take place between electric field vibration components of a light allowed to travel through the optical fiber and will cause a complex change in polarized state of the light.

The polarization maintaining optical fiber has already been known as an optical fiber capable of transmitting a light while maintaining the polarized state of the light. The polarization maintaining optical fiber has a waveguide structure having an advanced phase axis and retarded phase axis (two axes difference in refractive index) perpendicular to each other. In the waveguide structure of the optical fiber, a linearly polarized light incident along any one of the axes can be transmitted while the polarized state is being maintained.

However, even in case a light is guided through such a polarization maintaining optical fiber, when a magneto-optical disc is used as a recording medium with the conventional optical disc drive, the return light from the magneto-optical disc will be incident at a Kerr rotation angle upon the polarization maintaining optical fiber, and thus a phase difference will be caused between the field vibration components of the return light guided through the polarization maintaining optical fiber and will adversely affect the detection of signals.

DISCLOSURE OF THE INVENTION

Accordingly, the present invention has an object to overcome the above-mentioned drawbacks of the prior art by providing an optical disc drive compatible with all types of optical discs including magneto-optical discs.

The above object can be attained by providing an optical disc drive including means for rotating an optical disc, a light source to emit a light used for write and/or read of signals to and/or the optical disc, a head having installed therein an objective lens which converges the light emitted from the light source and being scanned over the optical disc being rotated by the rotating means to radiate the light converged by the objective lens to the optical disc, means for receiving a return light being a part of the light radiated from the head to the optical disc and which is reflected from the optical disc and detecting signals from the return light, and means for guiding the light emitted from the light source to the head and the return light from the optical disc to the signal detecting means.

In the above optical disc drive according to the present invention, the light transmitting means includes a polarization maintaining optical fiber and phase difference generating means to cancel out a phase difference between electric field vibration components generated when the light going towards the head or the return light going towards the signal detecting means is guided through the polarization maintaining optical fiber by the phase difference generated by the phase difference generating means or multiply the phase difference by an integer multiple of $\pi$.

In this optical disc drive, an installed optical disc is rotated by the disc rotating means, and a light used to write and/or read signals to and/or from the optical disc is emitted from the light source.

The light emitted from the light source is guided to the head by the light transmitting means including the polarization maintaining optical fiber and phase difference generating means. The head is scanned over the optical disc being rotated by the disc rotating means, and the light guided through the light transmitting means from the light source is converged by the objective lens and radiated to the optical disc.

A return light being a part of the light radiated from the head to the optical disc and reflected from the optical disc and which carries signals written on the optical disc, is guided by the light transmitting means to the signal detecting means. The signal detecting means thus receives the return light to detect the signals.

In the above optical disc drive according to the present invention, in case a magneto-optical disc from which signals are detected by the use of the Kerr effect is used as an optical disc, a return light from the magneto-optical disc will be incident in an off-axis manner upon the polarization maintaining optical fiber of the light transmitting means. Thus, in the return light guided through the polarization maintaining optical fiber, there will take place a phase difference between electric field vibration components depending upon the birefringence of the polarization maintaining optical fiber. In this optical disc drive, however, the phase difference between the field vibration components, having taken place in the light guided through the polarization maintaining optical fiber, is canceled out by a phase difference generated by the phase difference generating means or is multiplied by an integer multiple of π, so that the signals written on the magneto-optical disc can be detected properly.

That is, since it is possible to predict a distribution of refractive indices of the birefringence in the polarization maintaining optical fiber, magneto-optical signals can properly be detected by allowing the phase difference generating means to generate a predetermined phase difference in a light going towards the bead or a return light going towards the signal detecting means by means of the phase difference generating means correspondingly to a phase difference between field vibration components of the light, generated due to a birefringence of the polarization maintaining optical fiber and thus canceling out a phase difference between field vibration components, generated when the light is guided through the polarization maintaining optical fiber, or by multiplying the phase difference by an integer multiple of π to suppress the influence of the birefringence of the polarization maintaining optical fiber.

In the above optical disc drive, the light transmitting means is formed from the polarization maintaining optical fiber and phase difference generating means on the basis of the above-mentioned principle to cancel out a phase difference between field vibration components, having taken place in a light guided through the polarization maintaining optical fiber, by a phase difference generated by the phase difference generating means or to multiply the phase difference by an integer multiple of π, thereby permitting to properly detect magneto-optical signals. Thus, the optical disc drive according to the present invention is compatible with all types of optical discs including magneto-optical discs.

Note that in the above optical disc drive, the phase difference generating means of the light transmitting means should desirably be formed from a combination of a pair of wedge-shaped birefringent crystals whose crystal axes are perpendicular to each other. By using the combination of a pair of the wedge-shaped birefringent crystals whose crystal axes are perpendicular to each other as the phase difference generating means, it is possible to simply and accurately adjust a phase difference generated by the phase difference generating means and also to effectively suppress the light guided through the phase difference generating means from incurring an optical axis offset.

Also the above object can be attained by providing an optical disc drive including means for rotating a plurality of optical discs together, a light source which emits a light for use to write and/or read signals to and/or from the plurality of optical discs, a plurality of heads provided correspondingly to the plurality of optical discs, each of which has installed thereon an objective lens to converge a light emitted from the light source and is canned over an appropriate optical disc being rotated by the disc rotating means to radiate the light converged by the objective lens to the optical disc, means for receiving a return light being a part of the light radiated to the optical disc from a corresponding one of the plurality of heads to detect signals carried by the light, and means for guiding the light emitted from the light source to each of the plurality of heads and the return light from the optical disc to the signal detecting means.

In the above optical disc drive according to the present invention, the light transmitting means includes a plurality of polarization maintaining optical fibers corresponding to the plurality of optical discs, optical path selecting means for making a selection between an optical path for the light emitted from the light source and a one for the return light going towards the signal detecting means, and means for generating a phase difference, a phase difference between field vibration components, having taken place when the light going towards the head or the return light going towards the signal detecting means goes through a one of the polarization maintaining optical fibers, selected by the optical path selecting means, being canceled out by a phase difference generated by the phase difference generating means or being multiplied by an integer multiple of π.

In this optical disc drive, a plurality of optical discs installed therein are rotated together by the disc rotating means. Also, a light for use to write and/or read signals to and/or from the optical discs is emitted from the light source.

The light emitted from the light source is guided to the head by the light transmitting means including the plurality of polarization maintaining optical fibers, optical path selecting means and phase difference generating means. At this time, the optical path selector selects an appropriate one of the plurality of polarization maintaining fibers for incidence of the light emitted from the light source upon the selected polarization maintaining optical fiber, whereby the light emitted from the light source will be guided to only a head corresponding to a specified one of the plurality of optical discs rotated together by the disc rotating means.

The head is canned over the specified optical disc and converges, by the objective lens, the light emitted from the light source and guided by the light transmitting means, for radiation to the optical disc.

A return light being a part of the light emitted from the slight source, radiated to the specified optical disc and reflected from the latter and which carries signals, is guided to the signal detecting means by the light transmitting means. The signal detecting means receives the return light and detects signals carried thereby.

In the above optical disc drive according to the present invention, in case a magneto-optical disc from which signals are detected by the use of the Kerr effect is used as an optical disc, a return light from the magneto-optical disc will be incident in an off-axis manner upon the polarization maintaining optical fiber of the light transmitting means. Thus, in the return light guided through the polarization maintaining optical fiber, there will take place a phase difference between electric field vibration components depending upon the birefringence of the polarization maintaining optical fiber. In this optical disc drive, however, the phase difference between the field vibration components, having taken place in the light guided through the polarization maintaining optical fiber, is canceled out by a phase difference generated by the phase difference generating means or is multiplied by an integer multiple of π, so that the signals written on the magneto-optical disc can be detected properly. Therefore, this optical disc drive is compatible with all types of optical discs including magneto-optical discs.

Also, in this optical disc drive, since an optical path is selected for a light emitted from the light source by the optical path selector of the light transmitting means to radiate the light to a specified one selected among the plurality of optical discs, and the signal detecting means receives the return light and detects signals carried by the return light, it is not necessary to provide more than one light source and signal detecting means correspondingly to the plurality of optical discs but the light source and signal detecting means can be used in common to all the optical discs. Therefore, the optical disc drive can be constructed from a reduced number of parts and thus can be produced with less costs.

Note that if a phase difference is caused to take place between field vibration components of a light going towards the head and return light going towards the signal detecting means when the optical path is selected for the light going to the head or return light going to the signal detecting means, it is desirable to adjust the phase difference to an integer multiple of π. For example, in case the optical path selector is arranged to change the optical path from one to another by reflecting an incident light, the phase difference taking place in the light can be adjusted to an integer multiple of π by the use of a dielectric membrane to reflect the light.

Also, in this optical disc drive, the phase difference generating means of the light transmitting means should desirably be formed from a combination of a pair of wedge-shaped birefringent crystals whose crystal axes are perpendicular to each other. By using the combination of a pair of the wedge-shaped birefringent crystals whose crystal axes are perpendicular to each other as the phase difference generating means, it is possible to simply and accurately adjust a phase difference generated by the phase difference generating means and also to effectively suppress the light guided through the phase difference generating means from incurring an optical axis offset.

Also, in this optical disc drive, the phase difference generating means of the light transmitting means should desirably be provided in each of the plurality of heads corresponding to the plurality of optical discs. In this case, a phase difference generated by each of the phase difference generating means can be adjusted for each of the plurality of polarization maintaining optical fibers.

Also, in this optical disc drive, the phase difference generating means of the light transmitting means may be disposed in the optical path between the optical path selector and the light source and signal detecting means. In this case, the phase difference generating means can be used in common and thus the optical disc drive can be constructed from a reduced number of parts. In this case, however, the plurality of polarization maintaining optical fibers has to be equal in length to each other for a similar phase difference to take place in each of the polarization maintaining optical fibers.

DETAILED DESCRIPTION OF THE INVENTION

These objects and other objects, features and advantages of the present invention will become more apparent from the following detailed description of the preferred embodiments of the present invention when taken in conjunction with the accompanying drawings.

Figure 1:
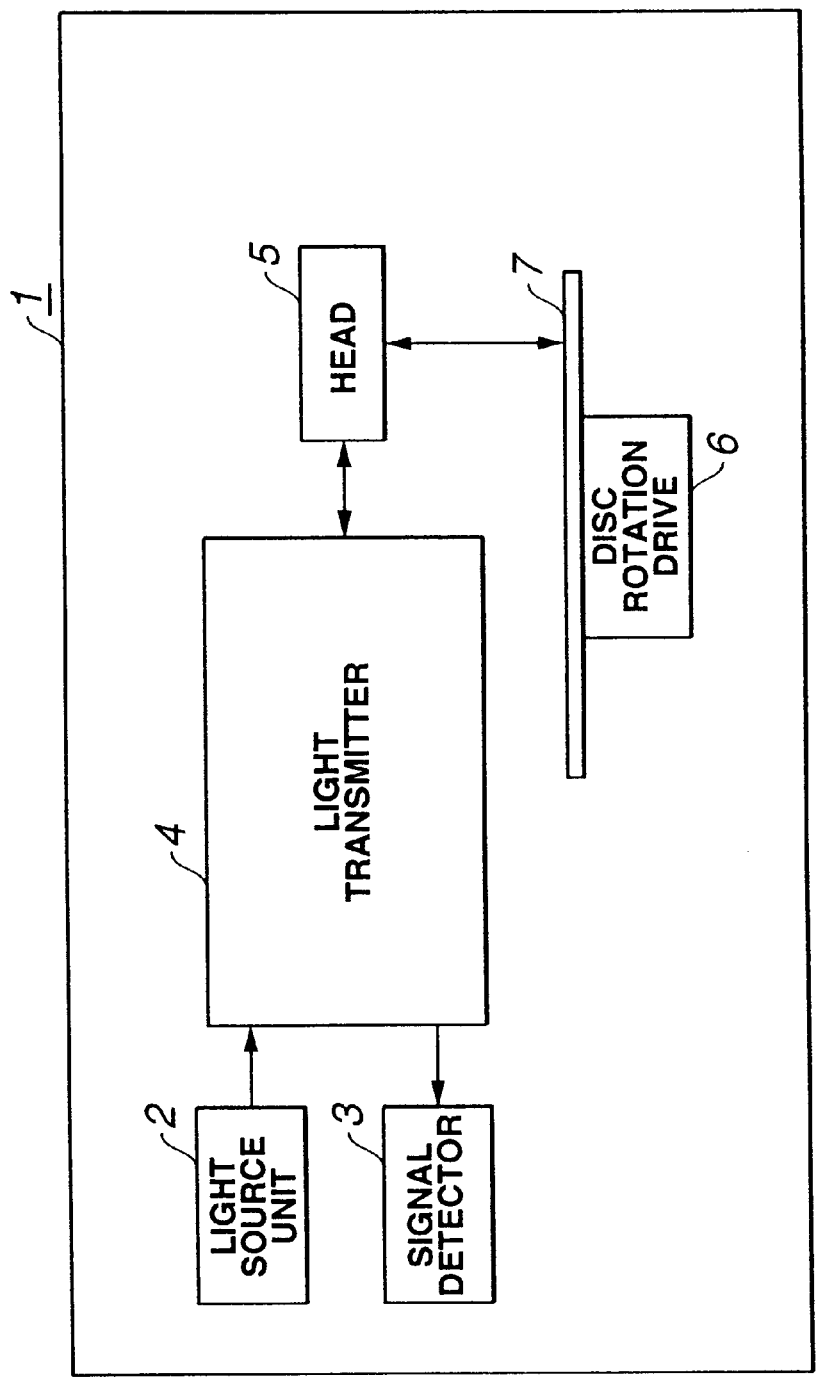
FIG. 1 schematically illustrates the construction of the optical disc drive according to the present invention.

Referring now to FIG. 1, there is schematically illustrated the construction of the optical disc drive according to the present invention. The optical disc drive is generally indicated with a reference 1. As shown, the optical disc drive 1 includes a light source unit 2, signal detector 3, light transmitter 4, head 5 and a disc rotation drive 6. In this optical disc drive 1, a light emitted from the light source unit 2 is guided through the light transmitter 4 to the head 5 for radiation to an optical disc 7 being rotated by the disc rotation drive 6, and a return light from the optical disc 7 is guided by the light transmitter 4 via the head 5 to the signal detector 3 which will thus detect signals carried by the return light.

Figure 2:
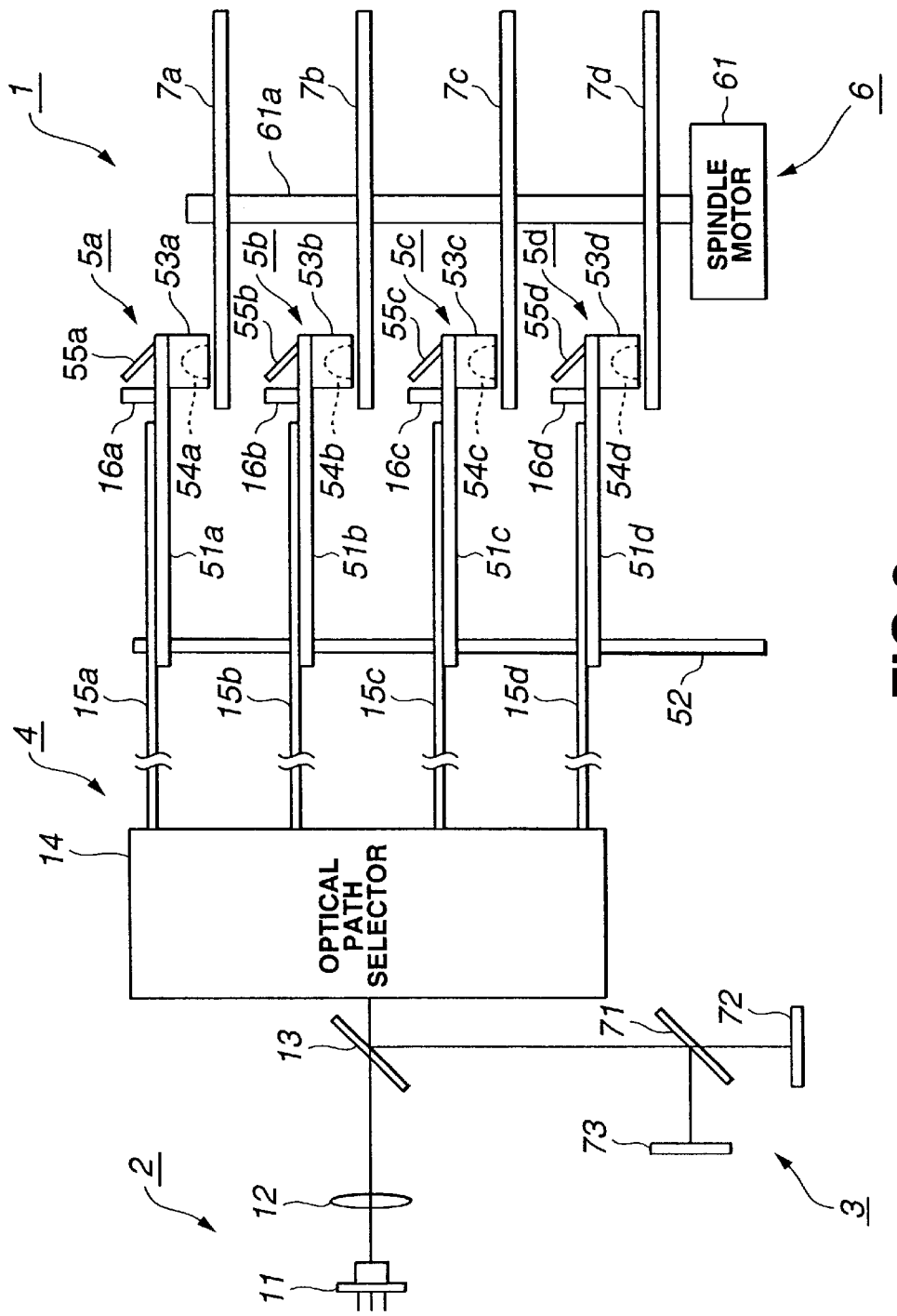
FIG. 2 shows an example construction of the optical disc drive shown in FIG. 1.

The above optical disc drive 1 is constructed as shown in further detail in FIG. 2. As shown, the optical disc drive 1 has installed therein four magneto-optical discs including a first one 7a, second one 7b, third one 7c and fourth one 7d as the optical disc. The optic disc drive 1 will write and/or read signals to and/or from a selected one of these first to fourth magneto-optical discs 7a, 7b, 7c and 7d.

The light source unit 2 includes a light source 11 made of a semiconductor laser for example and a combination lens 12 which converges a light emitted from the light source 11. The light converged by the combination lens 12 will be guided by the light transmitter 4 to the head 5.

The light transmitter 4 includes a beam splitter 13 which splits an optical path for a light from the light source unit 2 and an optical path for a return light going towards the signal detector 3 from each other, an optical path selector 14, a plurality of polarization maintaining optical fibers, first to fourth, 15a, 15b, 15c and 15d, corresponding to the first to fourth magneto-optical discs 7a, 7b. 7c and 7d, respectively, and a plurality of phase difference generators, first to fourth, 16a, 16b, 16c and 16d, also corresponding to the first to fourth magneto-optical discs 7a, 7b, 7c and 7d, respectively.

Figure 3:
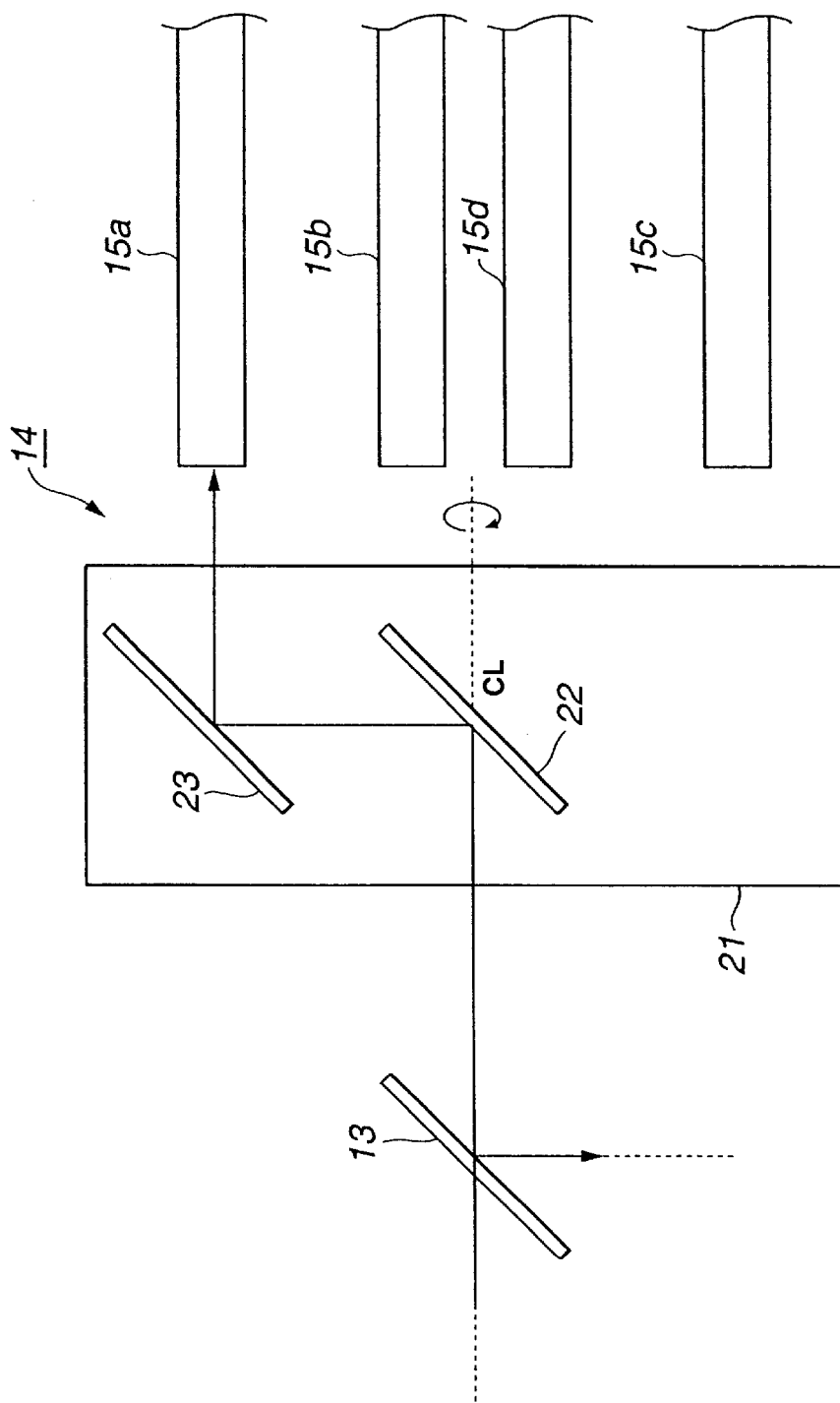
FIG. 3 is a schematic diagram of the optical path selector and its neighborhood of the optical disc drive in FIG. 1.

As will be seen from FIG. 3, the optical path selector 14 includes a rotator 21 which is rotated by a stepping motor or the like (not shown) with a center axis of rotation CL thereof being aligned with the optical path of the light having transmitted through the beam splitter 13. The rotator 21 has installed thereon a first mirror 22 disposed on the center axis of rotation CL of the rotator 21 and tilted 45 deg. with respect to the center axis of rotation CL and a second mirror 23 disposed parallel to the first mirror 22 and in a position off the center axis of rotation CL.

At the optical path selector 14, a light emitted from the light source 11, converged by the combination lens 12 and passed through the beam splitter 13, is by the first mirror 22 and then by the second mirror 23 for incidence upon one of the first to fourth polarization maintaining optical fibers 15a, 15b, 15c and 15d.

The second mirror 23 installed in a position off the center axis of rotation CL of the rotator 21 will move delineating a circle when the rotator 21 is rotated. Therefore, the optical path of the light reflected by the second mirror 23 is also changed as the rotator 21 is rotated. By disposing the first to fourth polarization maintaining optical fibers 15a, 15b, 15c and 15d in such a manner that their one ends will be positioned with a predetermined spacing between them along the moving locus of the second mirror 23 and controlling the rotation of the rotator 21 so that the optical path of the reflected light from the second mirror 23 will be centered coincident with the optical axis of a selected one of the first to fourth polarization maintaining optical fibers 15a, 15b, 15c and 15d, it is possible to make an incidence of the light upon only the selected polarization maintaining optical fiber.

In this optical disc drive 1, an optical path is selected for a light from the light source unit 2 by the optical path selector 14 to lead the light for incidence upon a selected one of the first to fourth polarization maintaining optical fibers 15a, 15b, 15c and 15d and thus radiate the light to only a one of the magneto-optical discs 7a, 7b, 7c and 7d corresponding to the selected polarization maintaining optical fiber, whereby signals are written to and/or read from the magneto-optical disc.

Also, the optical path selector 14 reflects a return light from the magneto-optical disc and returned through the selected polarization maintaining optical fiber by the second and first mirrors 23 and 22 in this order towards the beam splitter 13. The return light incident upon the beam splitter 13 is reflected by the latter towards the signal detector 3.

The return light from the magneto-optical disc is returned with the polarization axis thereof rotated under the Kerr effect. Since this optical disc drive 1, since the Kerr effect is utilized to detect signals written in the magneto-optical disc, it is necessary to guide the return light to the signal detector 3 with the Kerr rotation angle being maintained. Since the optical path selector 14 uses the first and second mirrors 22 and 23 to change the optical path from one to another, when a light is reflected by the first and second mirrors 22 and 23, the light will incur a phase difference between field vibration components. Thus in the optical path selector 14, it is desirable to use a dielectric membrane, for example, as a reflective layer of the first and second mirrors 22 and 23 in order to multiply the phase difference between field vibration components, produced in the light reflected as in the above by an integer multiple of $\pi$.

The first to fourth polarization maintaining optical fibers 15a, 15b, 15c and 15d (will generically be referred to as "polarization maintaining optical fiber 15" whenever appropriate hereunder) are adapted to impart a stress in one direction of the core through which a light is guided, thereby causing a difference in refractive index between the direction in which the stress is imparted and a direction perpendicular to the above direction to allow the polarization maintaining optical fiber 15 to show a birefringence. Of the polarization maintaining optical fiber 15, the distribution of the refractive index of birefringence can be predicted.

Figure 4:
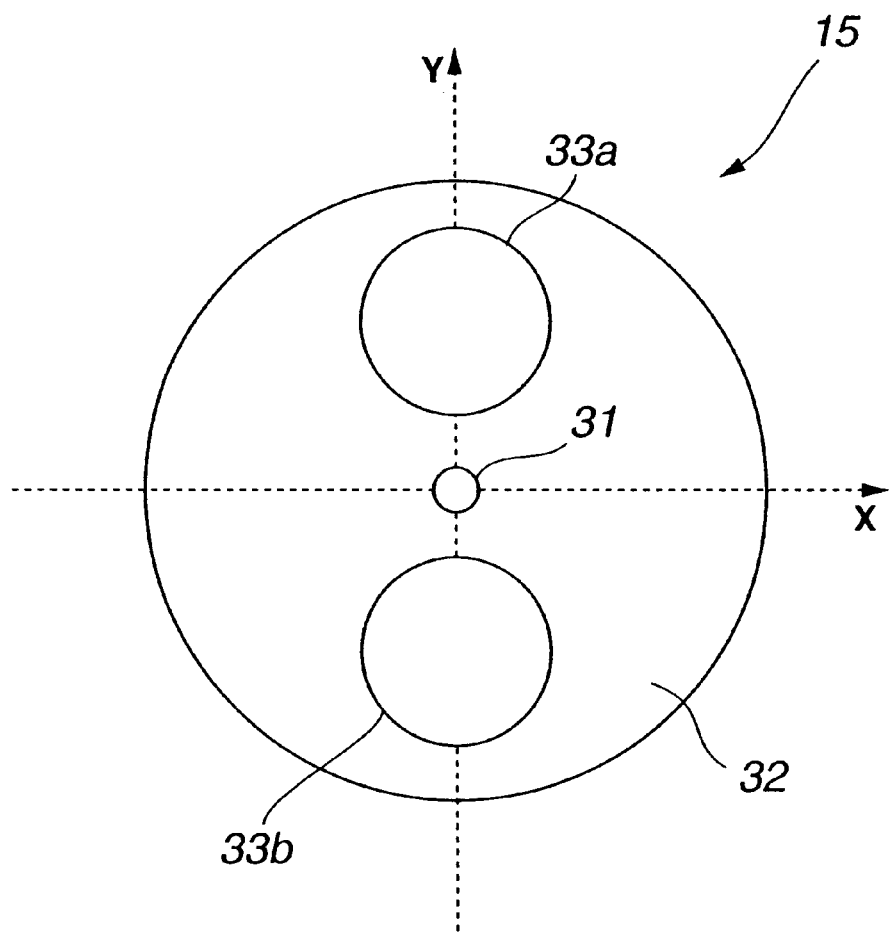
FIG. 4 is a schematic sectional view of a PANDA type polarization maintaining optical fiber provided in the optical disc drive shown in FIG. 1.

FIG. 4 schematically illustrates the cross section of a so-called PANDA type polarization maintaining optical fiber having been proposed as an example of the above polarization maintaining optical fiber 15. The PANDA type polarization maintaining optical fiber 15 includes a core 31 having a large refractive index covered by a clad 32 whose refractive index is smaller than that of the core 31, and a pair of stress raisers 33a and 33b disposed also in the clad 32 at both sizes of the core 31, respectively, to impart stresses to the core 31. This PANDA type polarization maintaining optical fiber 15 is formed as a tube in which the core 31 has an extremely small circular section having a diameter of 5 $\mu$m for example and the clad 32 has a circular section having a diameter of 125 $\mu$m for example.

In the polarization maintaining optical fiber 15, a light incident upon the core 31 is allowed to travels while being totally reflected repeatedly at the boundary between the core 31 and clad 32. At this time, in the PANDA type polarization maintaining optical fiber 15, stresses are imparted by the pair of stress raisers 33a and 33b to the core 31 in a direction from the center of the core 31 to that of the pair of stress raisers 33a and 33b (in the direction of a Y axis in FIG. 4). Therefore, the core 31 will have a birefringence caused by a difference in refractive index between the Y-axial direction and a direction perpendicular to the Y axis (in the direction of an X axis in FIG. 4).

In this polarization maintaining optical fiber 15, a linearly polarized light incident in the Y-axial direction or in the X-axial direction perpendicular to the Y axis, to which the stress of the core 31 is imparted, can be transmitted with its polarization being maintained. However, the optical disc drive 1, uses the magneto-optical disc as an optical disc 7, and thus a light going towards the magneto-optical disc will be polarized in one direction while a return light from the magneto-optical disc will be polarized in the other direction, under the Kerr effect. To avoid this, the above light beams are made incident upon the polarization maintaining optical fiber 15 in the off-axis manner in this optical disc driver 1, whereby the light traveling through the polarization maintaining optical fiber 15 will incur a phase difference between field vibration components. In this optical disc driver 1, however, the first to fourth phase difference generators 16a, 16b, 16c and 16d are provided in the optical paths for light beams traveling through the polarization maintaining optical fibers 15, respectively, to cancel a phase difference between field vibration components taking place in a light traveling through the polarization maintaining optical fiber 15 with a phase difference generated by each of the first to fourth phase difference generators 16a, 16b, 16c and 16d or to multiply the phase difference by an integer multiple of π, thereby suppressing the influence of the birefringence of the polarization maintaining optical fiber 15, and thus the optical disc drive 1 can detected magneto-optical signals properly.

The first to fourth phase difference generators 16a, 16b, 16c and 16d (will generically be referred to as "phase difference generator 16" wherever appropriate hereunder) are provided to positively raise a phase difference in a transmitted light, thereby canceling a phase difference between field vibration components, raised in a light traveling through the polarization maintaining optical fiber 15 or multiplying the phase difference by an integer multiple of π. An example of such a phase difference generator 16 is schematically illustrated in FIG. 5.

Figure 5:
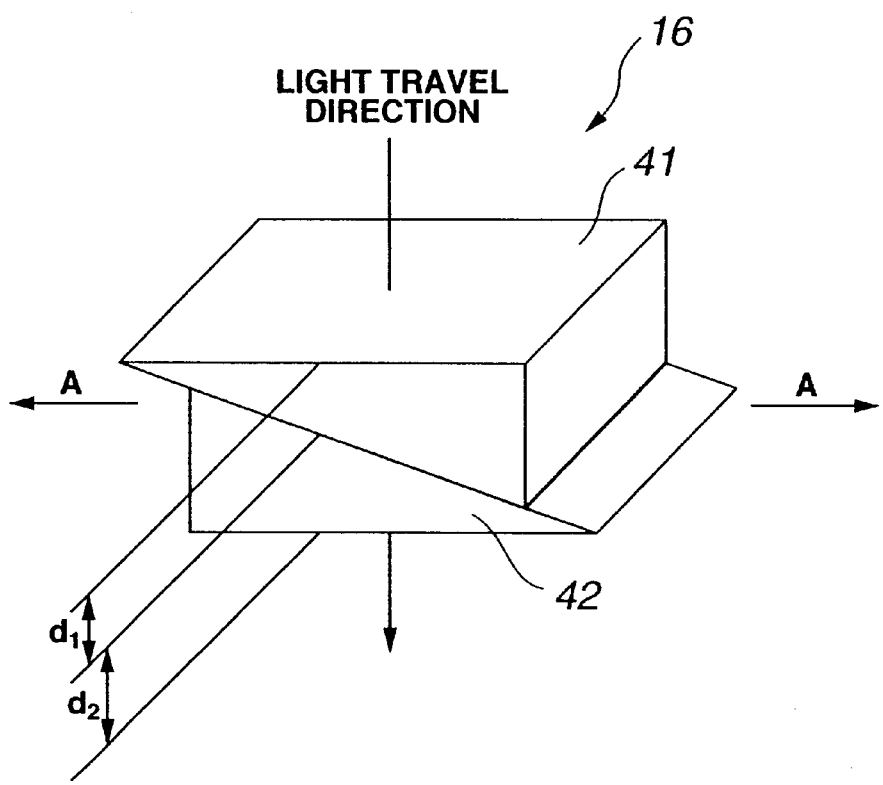
FIG. 5 is a perspective view of an example of the phase difference generating means provided in the optical disc drive in FIG. 1.

As shown in FIG. 5, the phase difference generator 16 is called "Babinet compensator" being a combination of a pair of wedge-shaped birefringent crystals 41 and 42 whose crystal axes are perpendicular to each other. The birefringent crystals 41 and 42 are made of a uniaxial birefringent material such as calcite, quartz or the like. The uniaxial birefringent material has two different refractive indices one in a direction along the crystal axis and the other in a direction perpendicular to the crystal-axial direction. The uniaxial birefringent crystal is formed to be a wedge. The birefringent crystals 41 and 42 in pair thus formed are joined with their slat faces laid to butt on each other to form the phase difference generator 16. In this phase difference generator 16, the birefringent crystals 41 and 42 in pair are moved in the direction of arrow A in FIG. 5 along their butting surfaces to properly change the thickness of the birefringent crystals 41 and 42 at a part of the phase difference generator 16 through a light is transmitted to set a phase difference raised in the light transmitted through the phase difference generator 16 to an arbitrary value.

For example, on the assumption that the two different refractive indices in the direction along the crystal axis and that perpendicular to the crystal axis, respectively, are $n_1$ and $n_2$ and the thickness of the part of one (41) of the pair of birefringent crystals 41 and 42 through which the light is first transmitted is $d_1$, a phase difference $\Delta\Phi_1$ raised in the light transmitted through the birefringent crystal 41 is given by the following expression (1):

$$\Delta\Phi_1 = 2\pi d_1(|n_1-n_2|)/\lambda \quad (1)$$

where λ is a wavelength of the light source 11.

Also, on the assumption that the thickness of the part of the other birefringent crystal 42 is $d_2$, a phase difference $\Delta\Phi_2$ raised in the light transmitted through this birefringent crystal 42 is given by the following expression (2):

$$\Delta\Phi_2 = -2\pi d_2(|n_1-n_2|)/\lambda \quad (2)$$

A phase difference $\Delta\Phi$ raised in the light transmitted through the phase difference generator 16 formed from the combination of the birefringent crystals 41 and 42 is given by the following expression (3):

$$\Delta\Phi = 2\pi/\lambda(d_1-d_2)(|n_1-n_2|) \quad (3)$$

As will be seen from the expression (3), by properly changing thicknesses $d_1$ and $d_2$ of the parts of the birefringent crystals 41 and 42, respectively of the phase difference generator shown in FIG. 5, through the light is passed, it is possible to set the phase difference raised in the light having passed through the phase difference generator 16 to an arbitrary value.

In the optical disc drive 1, such a phase difference generator 16 is disposed in the optical path for the light traveling through the polarization maintaining optical fiber 15 to have the light traveling through the polarization maintaining optical fiber 15 to pass through the phase difference generator 16 in order to generate a phase difference in the light, thereby canceling a phase difference raised in the light traveling through the polarization maintaining optical fiber 15 by the generated phase difference or multiplying the phase difference raised in the light (a phase difference raised in the light traveling through the polarization maintaining optical fiber 15+phase difference raised in the light passing through the phase difference generator 16) by an integer multiple of π.

Note that it is possible to confirm by a "Senarmon birefringence measurement" method if the optical phase difference is properly adjusted. If the phase difference is not properly adjusted, the thicknesses $d_1$ and $d_2$ of the parts of the birefringent crystals 41 and 42 of the phase difference generator 16, through the light is transmitted, should be changed to adjust the phase difference raised in the light transmitted through the phase difference generator 16. The "Senarmon" method is a well-known method and so will not further be discussed here.

In the above, the phase difference generator 16 formed from a combination of the wedge-shaped birefringent crystals 41 and 42 in pair, has been described. Note that the phase difference generator 16 is not limited to the above mentioned one by may be made of a one selected from a wide variety of birefringent materials. For example, the phase difference generator 16 may be made of a single birefringent crystal formed in the form of a wedge from a uniaxial birefringent material. In this case, by changing the incident position of a light upon the birefringent crystal properly, it is possible to set a phase difference raised in the light transmitted through the birefringent crystal to an arbitrary value. In this case, however, since the direction in which the light transmitted through the birefringent crystal travels will vary, it is necessary to adjust the optical system.

In the optical disc drive 1 according to the present invention, the four phase difference generators 16 (first to fourth ones 16a, 16b, 16c ad 16d) are provided correspondingly to the first to fourth polarization maintaining optical fibers 15a, 15b, 15c and 15d, respectively. The first to fourth phase difference generators 16a, 16b, 16c ad 16d are mounted on the four heads 5 (first to fourth ones 5a, 5b, 5c and 5d) provided correspondingly to the first to fourth magneto-optical discs 7a, 7b, 7c and 7d, respectively.

As shown in FIG. 2, the first to fourth heads 5a, 5b, 5c and 5d are provided with support arms 51a, 51b, 51c and 51d supported at the base ends thereof and provided for the free ends thereof to face top sides of the first to fourth magneto-optical discs 7a, 7b, 7c and 7d, respectively.

The support arms 51a, 51b, 51c and 51d are provided each at the base end thereof with a turning drive such as a voice coil motor or the like, respectively. Each of the support arms 51a, 51b, 51c and 51d is turned about a spindle 52 by the turning drive.

Further, the support arms 51a, 51b, 51c and 51d have floating slides 53a, 53b, 53c and 53d, respectively, fixed at the free ends thereof and at the sides of the latter opposite to the first to fourth magneto-optical discs 7a, 7b, 7c and 7d, respectively. Each of the floating sliders 53a, 53b, 53c and 53d is applied with an air flow generated when a corresponding one of the first to fourth magneto-optical discs 7a, 7b, 7c and 7d is rotated, and thus is floated a predetermined amount above the magneto-optical disc, As each of the support arms 51a, 51b, 51c and 51d is turned by the turning drive and a corresponding one of the magneto-optical discs 7a, 7b, 7c and 7d is driven to spin, a corresponding one of these floating slides 53a, 53b, 53c and 53d is scanned over the corresponding magneto-optical disc.

The floating sliders 53a, 53b, 53c and 53d incorporate objective lenses 54a, 54b, 54c and 54d, respectively. Each of the objective lenses 54a, 54b, 54c and 54d condenses a light emitted from the light source unit 2 and guide to a corresponding one of the first to fourth heads 5a, 5b, 5c and 5d through the light transmitter 4, and radiates the light to a corresponding one of the first to fourth magneto-optical discs 7a, 7b, 7c and 7d. The light condensed through the corresponding one of the objective lenses 54a, 54b, 54c and 54d and radiated to the corresponding one of the first to fourth magneto-optical discs 7a, 7b, 7c and 7d forms a light spot on the signal recording surface of the magneto-optical disc. Signals will be written to a part of the magneto-optical disc where the light spot is defined, and also signals be read from such a part of the magneto-optical disc.

Also, in the optical disc drive 1 using the first to fourth magneto-optical discs 7a, 7b, 7c and 7d as an optical disc 7, the floating sliders 53a, 53b, 53c and 53d incorporate magnetic coils (not shown) along with the objective lenses 54a, 54b, 54c and 54d, respectively. During signal recording, a magnetic field is applied to a part of each of the first to fourth magneto-optical discs 7a, 7b, 7c and 7d on which a light spot is defined to write signals to that part of the magneto-optical disc.

Further, the support arms 51a, 51b, 51c and 51d have provided at the free ends thereof optical path bending mirrors 55a, 55b, 55c and 55d, respectively, which reflect a light having been guided by the light transmitter 4 to the free end of each of the support arms 51a, 51b, 51c and 51d for incidence upon a corresponding one of the first to fourth objective lenses 54a, 54b, 54c and 54d, and also reflect a return light from a corresponding one of the first to fourth magneto-optical discs 7a, 7b, 7c and 7d towards the light transmitter 4.

The first to fourth magneto-optical discs 7a, 7b, 7c and 7d are mounted on the disc rotation drive 6. This disc rotation drive 6 includes a spindle motor 61 and a motor control circuit (not shown) which controls the operation of the spindle motor 61. The first to fourth magneto-optical discs 7a, 7b, 7c and 7d are installed together, to a spindle 61a of the spindle motor 61, and thus they are driven by the spindle motor 61 to rotate together at a constant angular velocity.

In this optical disc drive 1, a light emitted from the light source unit 2 will be transmitted to a selected one of the first to fourth heads 5a, 5b, 5c and 5d via the light transmitter 4. The light is condensed by the objective lens installed to the selected head will be radiated to a one of the first to fourth magneto-optical discs 7a, 7b, 7c and 7d being rotated together by the spindle motor 61, corresponding to the selected head. Also, a return light from that magneto-optical disc will be transmitted by the light transmitter 4 to the signal detector 3.

The signal detector 3 includes a polarization beam splitter 71 to polarize and split a return light reflected from a magneto-optical disc and transmitted by the light transmitter 4, a first photodetector 72 to receive one polarized light component from the polarization beam splitter 71 and convert it to an electricity, and a second photodetector 73 to receive the other polarized light component from the polarization beam splitter 71 and convert it to an electricity.

Based on the detection signal resulted from the light received and photoelectrically converted by the first photodetector 72 and that resulted from the light received and photoelectrically converted by the second photodetector 73, the signal detector 3 will produce a read signal from the magneto-optical disc, servo control signals such as a tracking error signal, focusing error signal, position information, etc. Note that a magneto-optical signal being the read signal from the magneto-optical disc is acquired from a difference between the detection signal from the first photodetector 72 and that from the second photodetector 73.

The operations effected by the optical disc drive 1 for reading signals recorded in each of the first to fourth magneto-optical discs 7a, 7b, 7c and 7d will be described herebelow. Note that the operations for reading signals recorded in the first one (7a) of the first to fourth magneto-optical discs 7a, 7b, 7c and 7d will be described by way of example and those for reading signals from each of the other magneto-optical discs 7b, 7c and 7d will be done similarly.

For reading signals recorded in the first magneto-optical disc 7a, first the first to fourth magneto-disc discs 7a, 7b, 7c and 7d are rotated together by the spindle motor 61. Then position information indicative of the present position of the first head 5a is detected, the turning drive such as a voice coil motor or the like is put into operation based on the position information to turn the support arm 51a, and the floating slider 53a is taken to a predetermined position on the first magneto-optical disc 7a.

Next, a reading light is emitted from the light source 11. The light emitted from the light source 11 is condensed by the combination lens 12, transmitted through the beam splitter 13 and incident upon the optical path selector 14.

The light incident upon the optical path selector 14 is reflected by the first mirror 22, and then reflected by the second mirror 23 for incidence upon the first polarization maintaining optical fiber 15a selected from the first to fourth polarization maintaining optical fibers 15a, 15b, 15c and 15d.

The incident light upon the first polarization maintaining optical fiber 15a travels through the core 31 while being repeatedly reflected at the boundary between the core 31 and clad 32 of the first polarization maintaining optical fiber 15a and thus transmitted to the free end of the support arm 51a. At this time, the light transmitted by the first polarization maintaining optical fiber 15a will incur a phase difference between field vibration components due to the birefringence of the first polarization maintaining optical fiber 15a.

The light going out of the first polarization maintaining optical fiber 15a passes through the first phase difference generator 16a. At this time, the light having traveled through the first polarization maintaining optical fiber 15a and passing through the first phase difference generator 16a will have a phase difference which will cancel the phase difference between field vibration components raised due to the birefringence of the first polarization maintaining optical fiber 15a or multiply the phase difference by an integer multiple of $\pi$. Thus, it will be possible to effectively inhibit the birefringence of the first polarization maintaining optical fiber 15a from adversely affecting the detection of magneto-optical signals.

The light having passed through the first phase difference generator 16a is reflected by the optical path bending mirror 55a for incidence upon the objective lens 54a incorporated in the floating slider 53a of the first head 5a. At this time, the floating slider 53a is applied with air flow generated by the first magneto-optical disc 7a being rotated and floated a predetermined amount over the first magneto-optical disc 7a.

The light incident upon the objective lens 54a is condensed by the latter for radiation as a linearly polarized light to a predetermined position on the first magneto-optical disc 7a. Thus, a light spot is formed to a predetermined position on the first magneto-optical disc 7a.

The light radiated as the linearly polarized light to the predetermined position on the first magneto-optical disc 7a has the polarization axis thereof rotated under the influence of a magnetic field (recording signal) applied to that position. A return light from the first magneto-optical disc 7a is incident again with the polarization axis rotated upon the first phase difference generator 16a via the objective lens 45a and optical path bending mirror 55a.

The return light having passed through the first phase difference generator 16a is transmitted by the first polarization maintaining optical fiber 15a. At this time, a phase difference raised between field vibration components when the return light traveling through the first polarization maintaining optical fiber 15a will be canceled by a phase difference raised when the return light passes through the first phase difference generator 16a or multiplied by an integer multiple of π.

The return light transmitted by the first polarization maintaining optical fiber 15a reaches the beam splitter 13 via the optical path selector 14 and is reflected by the beam splitter 13 towards the polarization beam splitter 71.

The return light having thus reached the polarization beam splitter 71 which will polarize and split the return light. That is, one polarized component of the return light having reached the polarization beam splitter 71 is transmitted through the polarization beam splitter 71 while the other polarized component is reflected by the polarization beam splitter 71.

The one polarized light component having transmitted through the polarization beam splitter 71 is received or detected by the first photodetector 72. Also, the other polarized light component reflected by the polarization beam splitter 71 is received by the second photodetector 73. The return light received by these first and second photodetectors 72 and 73 is photoelectrically converted and detected as a detection signal by the first and second photodetectors 72 and 73.

Based on these detection signals, a read signal (magneto-optical signal) from the first magneto-optical disc 7a, servo control signals, etc. are produced.

In the optical disc drive 1 according to the present invention, the light emitted from the light source 11 and return light from the magneto-optical discs 7a, 7b, 7c and 7d are transmitted by the polarization maintaining optical fiber 15 as having been described in the foregoing. A phase difference between field vibration components, raised in the light beams traveling through the polarization maintaining optical fiber 15 due to the birefringence of the latter, is canceled by a phase difference generated by the phase difference generator 16, or multiplied by an integer multiple of π. Thus, in this optical disc drive 1, it is possible to inhibit the birefringence of the polarization maintaining optical disc 15 from adversely affecting the detection of magneto-optical signals, thereby permitting to properly detect the magneto-optical signals.

There will further be described below the principle of canceling a phase difference raised in the light traveling through the polarization maintaining optical fiber 15 due to the birefringence of the latter by a phase difference generated by the phase difference generator 16 or multiplying the birefringence-caused phase difference by an integer multiple of π.

Figure 6:
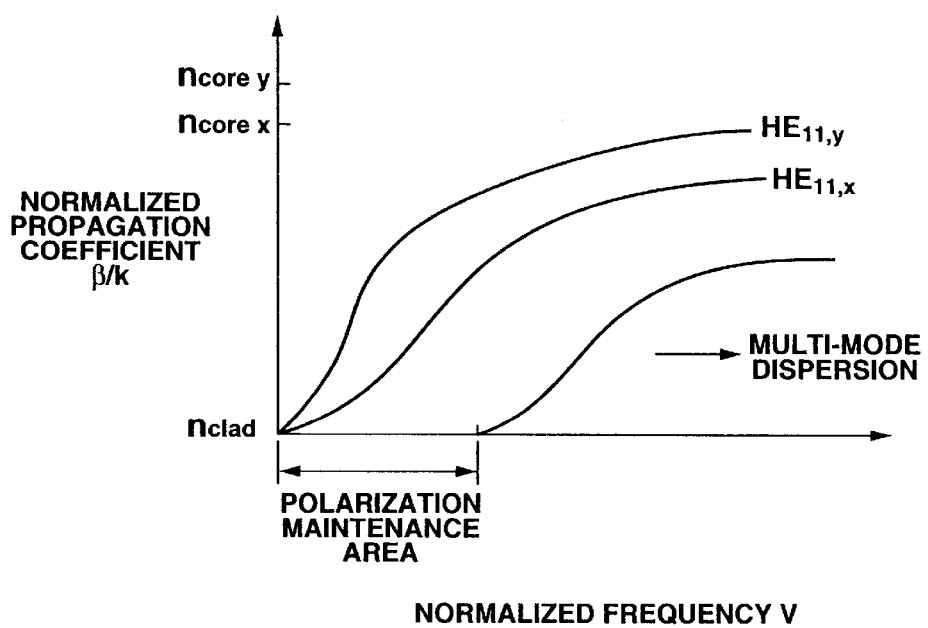
FIG. 6 shows the dispersion characteristic of the bound mode of the polarization maintaining optical fiber.

The dispersion characteristic of the bound mode of the PANDA type polarization maintaining optical fiber 15 shown in FIG. 4 is illustrated in FIG. 6. FIG. 6 shows a multi-mode dispersion which causes pulse signals to incur a delay distortion in the polarization maintaining optical fiber 15. In FIG. 6, the vertical axis indicates a normalized frequency V and the horizontal axis shows a normalized propagation coefficient β/k. Note that the normalized frequency V is dimensionless and given by $V=(2\pi a/\lambda)(n_{core}^2 - n_{clad}^2)^{1/2}$ (where a is the radius of the core 31, λ is the wavelength of the light, $n_{core}$ is the refractive index of the core 31, and $n_{clad}$ is the refractive index of the clad 32). Also the normalized propagation coefficient β/k is a division of the coefficient β of light propagation along the length of the polarization maintaining optical fiber 15 by a number of waves $k=2\pi/\lambda$.

Figure 7:
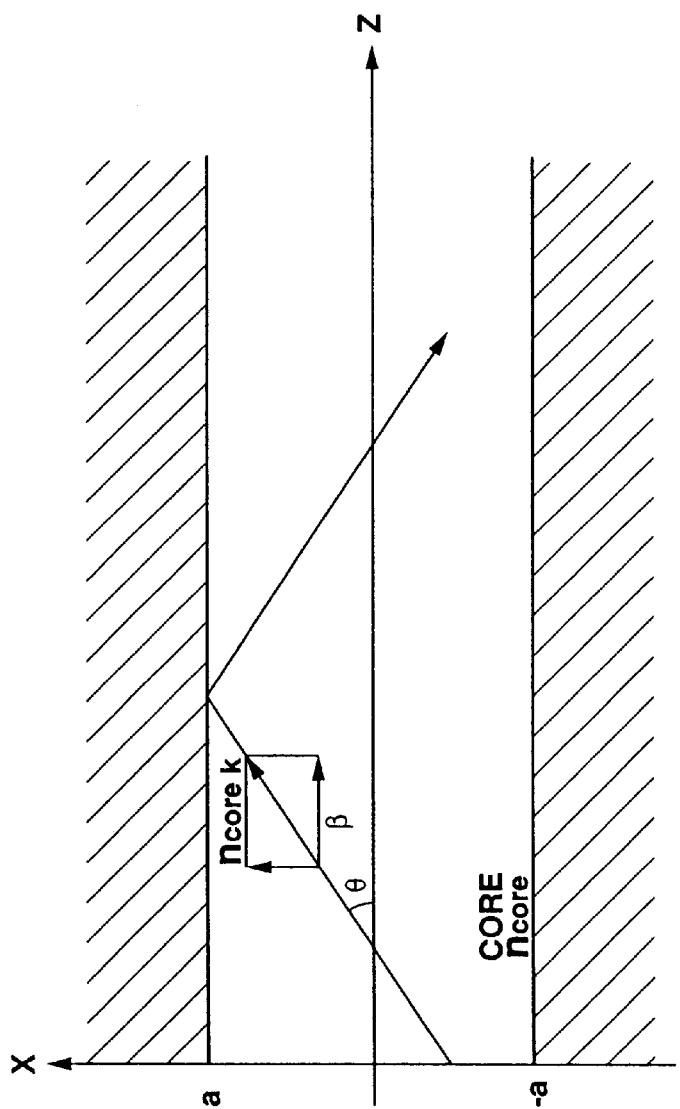
FIG. 7 is a sectional view of the core and its neighborhoods taken along the length of the polarization maintaining optical fiber.

Referring now to FIG. 7, there is illustrated in the form of a a sectional view the core 31 and its neighborhood, taken along the length (Z-axial direction) of the polarization maintaining optical fiber 15 shown in FIG. 4, perpendicular to the X and Y axes in FIG. 4. The relation between the propagation coefficient β and number of waves k will be explained herebelow with reference to FIG. 7.

On the assumption that a light having a propagation angle θ is propagated through the core 31, the propagation coefficient of the light in the traveling direction can be represented by $n_{core}k$ and the propagation coefficient β of the light traveling in the Z-axial direction be given by $\beta=n_{core}k\cos\theta$. The normalized propagation coefficient β/k can be given by $\beta/k=n_{core}k\cos\theta$. That is, it will be known that the smaller the propagation angle θ, the more approximate to the refractive index $n_{core}$ of the core 31 the normalized propagation coefficient β/k is while at an angle θ cutoff at which the propagation angle θ is large, the normalized propagation coefficient β/k is the refractive index $n_{clad}$ of the clad 32. Therefore, when the normalized propagation coefficient β/k is nearer to the refractive index $n_{core}$ of the core 31, the light can be bound in the core 31 for propagation through the polarization maintaining optical fiber 15, and when the normalized propagation coefficient β/k is nearer to the refractive index $n_{clad}$ of the clad 32, the light cannot be bound in the core 31 and can hardly be propagated through the polarization maintaining optical fiber 15.

The bound mode in which the light is propagated through the polarization maintaining optical fiber 15 will be described herebelow referring again to FIG. 6.

The bound mode for the light propagated through the core 31 having no birefringence is degenerated, but if there exists a birefringence, the degeneracy will be canceled and the mode will be divided into two bound modes HE11, x and HE11, y as shown in FIG. 6. Note that the term "degeneracy" means a reduced freedom of the bound mode. As seen from FIG. 6, only the HE11, x and HE11, y modes permit to define a range of the normalized frequency V which can be propagated. This range is called "polarization maintenance area" in which the polarization maintaining optical fiber 15 can work well. Therefore, when the normalized frequency V has a value in the above range, the core 31 of the polarization maintaining optical fiber 15 will have a birefringence.

When the normalized frequency V takes a larger value than the polarization maintenance area, the propagation is made in multiple modes, resulting in a multi-mode dispersion with which magneto-optical signal light can hardly be propagated. The wavelength of the normalized frequency V which will lead to the multi-mode dispersion is generally called "cutoff wavelength". Note that the polarization maintaining optical fiber 15 having been described in the foregoing is commercially available. In such a commercially available polarization maintaining optical fiber, when a light having a wavelength λ of 633 nm from a semiconductor laser is transmitted, the difference in birefringent index is on the order of 6×10⁻⁴ and the cutoff wavelength is about 600 nm. The direction of refractive index distribution of the polarization maintaining optical fiber 15 can be known at a stage where the polarization maintaining optical fiber 15 is delivered from its manufacturer.

Figure 8:
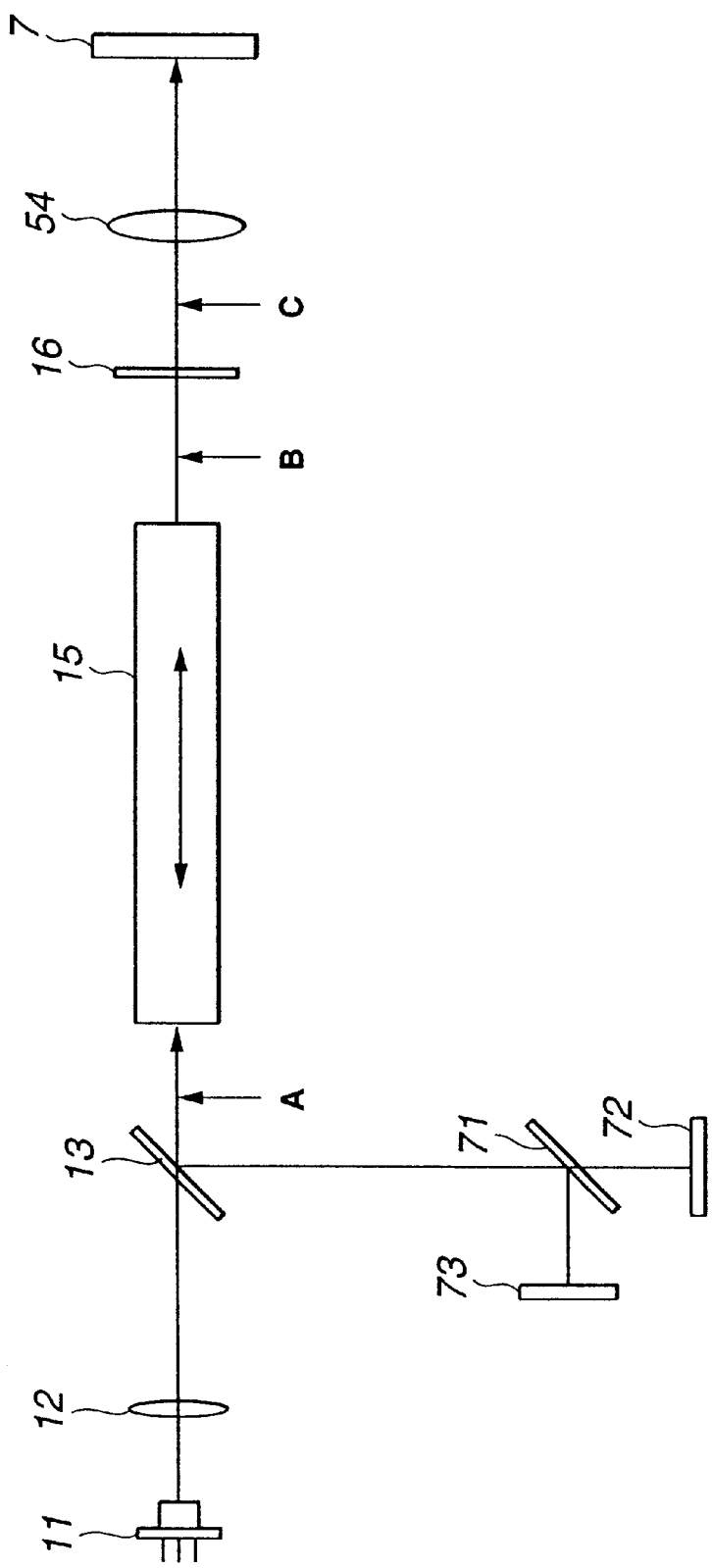
FIG. 8 is a schematic diagram of the optical path in the optical disc drive shown in FIG. 1.
Figure 9:
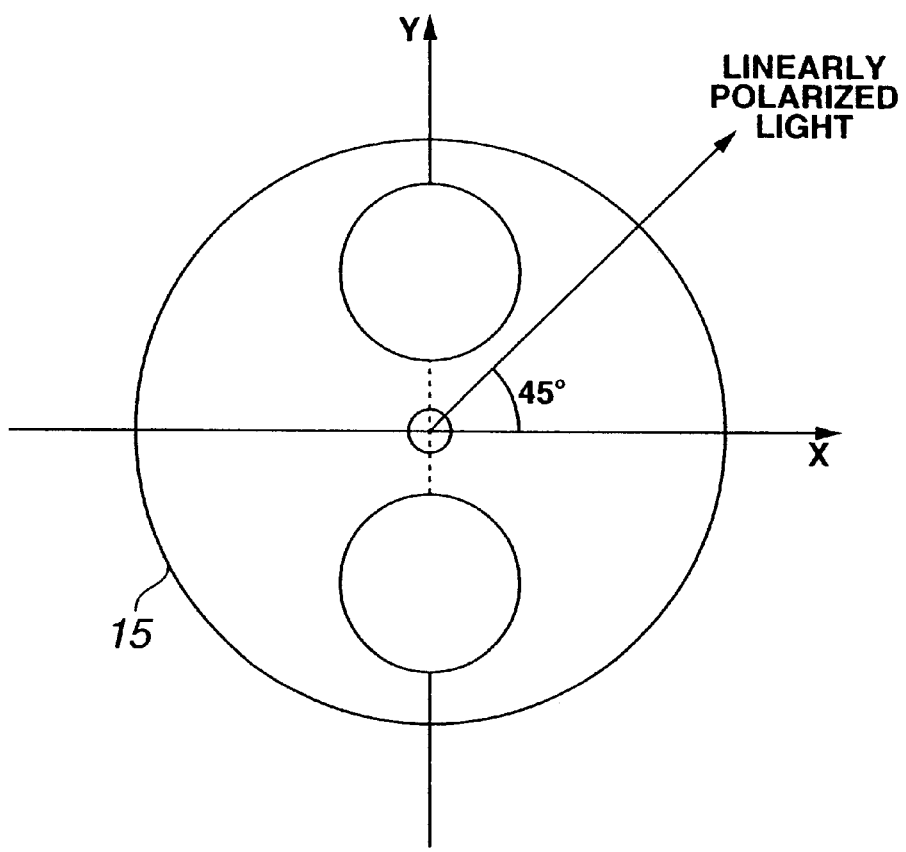
FIG. 9 is a schematic diagram of the polarized state of a light going towards a magneto-optical disc at a position indicated with an arrow A in FIG. 8 as viewed from the traveling direction of the light.
Figure 10:
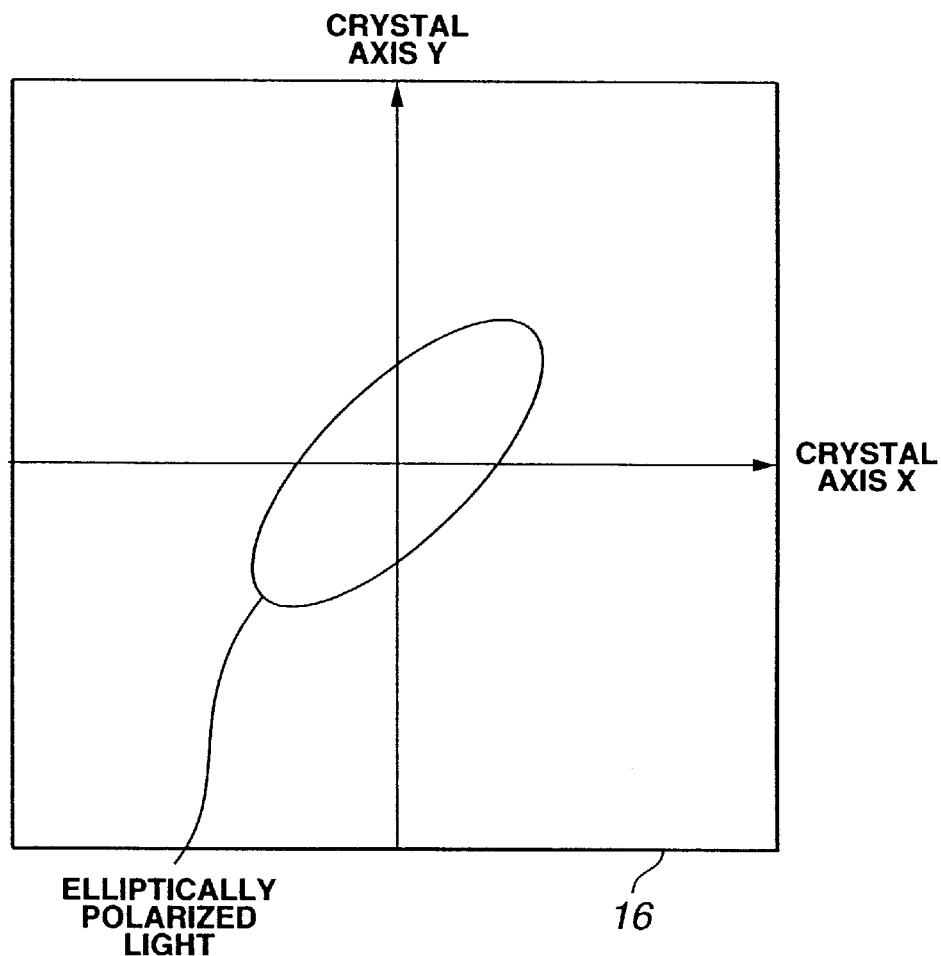
FIG. 10 is a schematic diagram of the polarized state of a light going towards the magneto-optical disc at a position indicated with an arrow B in FIG. 8 as viewed from the traveling direction of the light.
Figure 11:
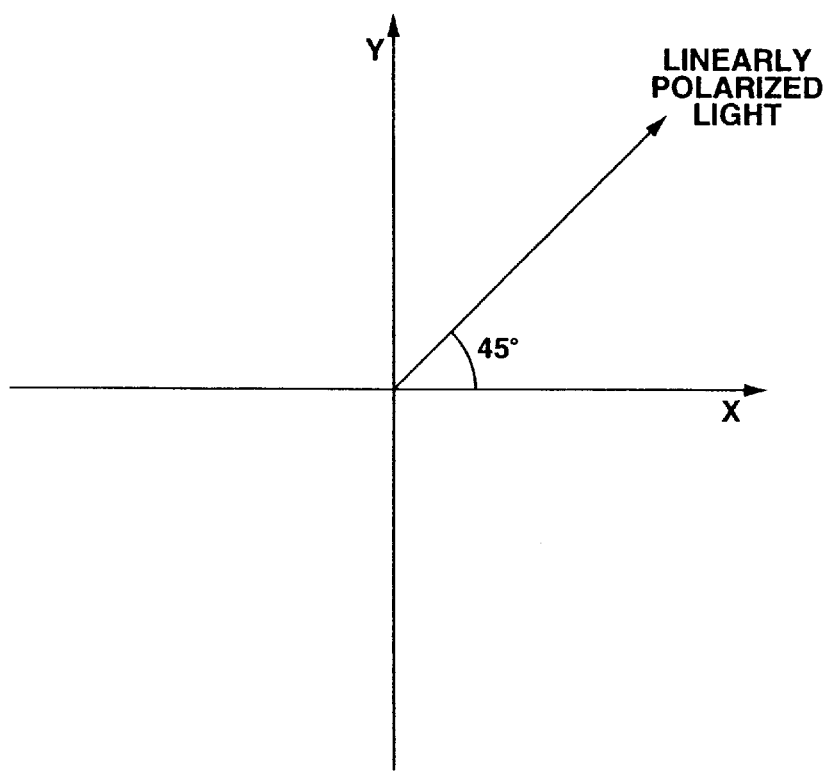
FIG. 11 is a schematic diagram of the polarized state of a light going towards the magneto-optical disc at a position indicated with an arrow C in FIG. 8 as viewed from the traveling direction of the light.

FIG. 8 is a schematic diagram of the optical path along which a light going towards the magneto-optical disc 7 travels, including the polarization maintaining optical fiber 15, and FIGS. 9 to 11 schematically illustrate the polarized state of the light going towards the magneto-optical disc 7 as viewed from the traveling direction of the light. Referring to these figures, there will be described how to compensate a phase difference between field vibration components, raised in the light due to the birefringence of the polarization maintaining optical fiber 15 when the light is traveling through the polarization maintaining optical fiber 15, by the phase difference generator 16 disposed in the optical path. Note that the optical path selector 14 is omitted from FIG. 8 but each of the pair of mirrors 22 and 23 of the optical path selector 14 should preferably have a dielectric membrane formed on the reflective surface thereof as having previously been described and the reflection-caused change of the phase difference between field vibration components should be set to an integer multiple of π.

A light emitted from the light source 11 and transmitted through the combination lens 12 and beam splitter 13 is a linearly polarized one. It is incident upon the polarization maintaining optical fiber 15 with the polarization axis inclined an angle of 45° with respect to the X axis of the polarization maintaining optical fiber 15 as shown in FIG. 9. Note that FIG. 9 shows the polarized state of the light at a position indicated with an arrow A in FIG. 8 as viewed from the traveling direction of the light.

The light will be propagated through the polarization maintaining optical fiber 15. During this propagation, the light will be elliptically or circularly polarized under the influence of a phase difference raised due to the birefringence of the polarization maintaining optical fiber 15.

The light having been elliptically or circularly polarized under the influence of the phase difference raised due to the birefringence of the polarization maintaining optical fiber 15 will be incident upon the phase difference generator 16 disposed in such a manner that the crystal axes X and Y coincide with the advanced phase axis (X axis) and retarded phase axis (Y axis) of the polarization maintaining optical fiber 15. Note that FIG. 10 shows the polarized state of the light at a position indicated with an arrow B in FIG. 8 as viewed from the traveling direction of the light. At this time, the retardation of the phase difference generator 16 (phase retardation of field vibration components of the light) should be set to such a value as cancels a phase difference raised due to the birefringence of the polarization maintaining optical fiber 15 or as multiplies the phase difference by an integer multiple of π.

The phase difference between field vibration components, raised due to the birefringence of the polarization maintaining optical fiber 15, depends upon the length and birefringent index, and will vary when the length and birefringent index of the polarization maintaining optical fiber 15 vary. Therefore, to absorb the variation of the phase difference between field vibration components, the retardation of the phase difference generator 16 has to be adjusted. The retardation of the phase difference generator 16 can easily be adjusted for example by changing the thicknesses $d_1$ and $d_2$ of parts of the birefringent crystals 41 and 42 through which the light is transmitted as in the above. Note that in case the phase difference generators 16a, 16b, 16c and 16d are provided correspondingly to the plurality of polarization maintaining optical fibers 15a, 15b, 15c and 15d, respectively, as having previously been described, the retardation of each of the phase difference generators 16a, 16b, 16c and 16d should be adjusted in advance, whereby it is not necessary to readjust it after that.

The light incident upon the phase difference generator 16 is passed through the latter to generate a phase difference which will cancel a phase difference raised due to the birefringence of the polarization maintaining optical fiber 15 or multiply the birefringence-caused phase difference by an integer multiple of π. As a result, the light will be rendered linearly polarized as shown in FIG. 11, and go out of the phase difference generator 16. Note that FIG. 11 shows the polarized state of the light at a position indicated with an arrow C in FIG. 8 as viewed from the traveling direction of the light.

The light rendered linearly polarized owing to the transmission through the phase difference generator 16 is incident upon the objective lens 54 which will radiate it to a predetermined recording position on the magneto-optical disc 7. Thus, a light spot will be defined in the predetermined recording position on the magneto-optical disc 7.

A change of the phases field vibration components of the light emitted from the light source 11 and going towards the magneto-optical disc 7 will be explained by the use of the Jones matrix. The Jones matrix is a notation of a polarized state of light, and the polarized state of the light emitted from the light source 11 is given by the following expression (4):

$$\text{light source} \to \begin{pmatrix} 1 \\ 1 \end{pmatrix} \quad (4)$$

On the assumption that the phase difference between field vibration components, raised due to the birefringence of the polarization maintaining optical fiber 15 is Δ, the change of the polarization to which the light emitted from the light source 11 is subjected is given by the following expression (5):

$$\text{polarization maintaining optical fiber} \to \begin{pmatrix} \text{Exp}\, i\frac{\Delta}{2} & 0 \\ 0 & \text{Exp} - i\frac{\Delta}{2} \end{pmatrix} \quad (5)$$

where i is an imaginary number and Δ is a phase difference raised due to the birefringence of the polarization maintaining optical fiber.

The change in phase of field vibration components due to the phase difference generator 16 disposed for the crystal axes X and Y thereof to coincide with the advanced and retarded axes of the polarization maintaining optical fiber 15 is given by the following expression (6):

$$\text{phase difference generator} \to \begin{pmatrix} \text{Exp}\, i\frac{-\Delta}{2} & 0 \\ 0 & \text{Exp} - i\frac{-\Delta}{2} \end{pmatrix} \quad (6)$$

where i is an imaginary number and Δ is a phase difference raised due to the birefringence of the polarization maintaining optical fiber.

Multiplication of the above expressions (4), (5) and (6) will result in the following expression (7):

$$\begin{pmatrix} \text{Exp}\,i\frac{-\Delta}{2} & 0 \\ 0 & \text{Exp}-i\frac{-\Delta}{2} \end{pmatrix}\begin{pmatrix} \text{Exp}\,i\frac{\Delta}{2} & 0 \\ 0 & \text{Exp}-i\frac{\Delta}{2} \end{pmatrix}\begin{pmatrix} 1 \\ 1 \end{pmatrix} = \begin{pmatrix} 1 \\ 1 \end{pmatrix} \quad (7)$$

As known from the expression (7), the polarized state of the light emitted from the light source 11 is stored. That is, the linearly polarized light emitted from the light source 11 is transmitted through the polarization maintaining optical fiber 15, and then passed through the phase difference generator 16. Thus, the polarized state of the light will be maintained and radiated to the magneto-optical disc 7 while maintaining its polarized state. Note that for recording magneto-optical signals, the temperature of a light spot defined on the magneto-optical disc 7 is elevated to above the Curie point. Also, for reading magneto-optical signals, the rotation of the plane of polarization under the Kerr effect, that is, the Kerr rotation, is detected from the reflected light from the magneto-optical disc 7.

Next, the polarized state of a return light from the optical disc 7 will be described herebelow with reference to FIGS. 8 and 12 to 15 showing the polarized state of the return light as viewed from the traveling direction of the return light.

Figure 12:
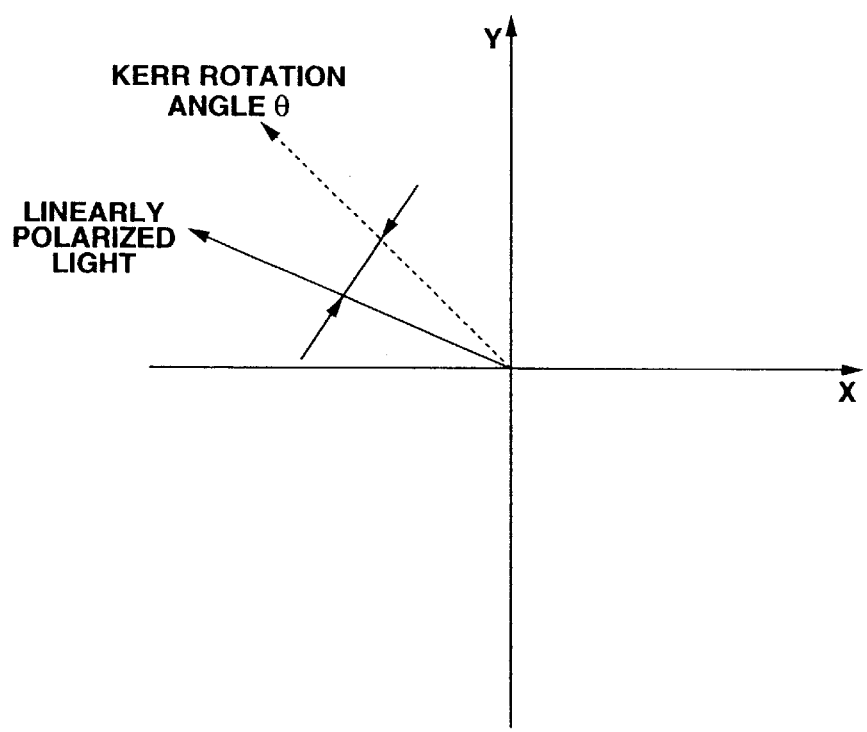
FIG. 12 is a schematic diagram of the polarized state of a return light from the magneto-optical disc and having the polarization thereof rotated under the Kerr effect as viewed from the traveling direction of the light.
Figure 13:
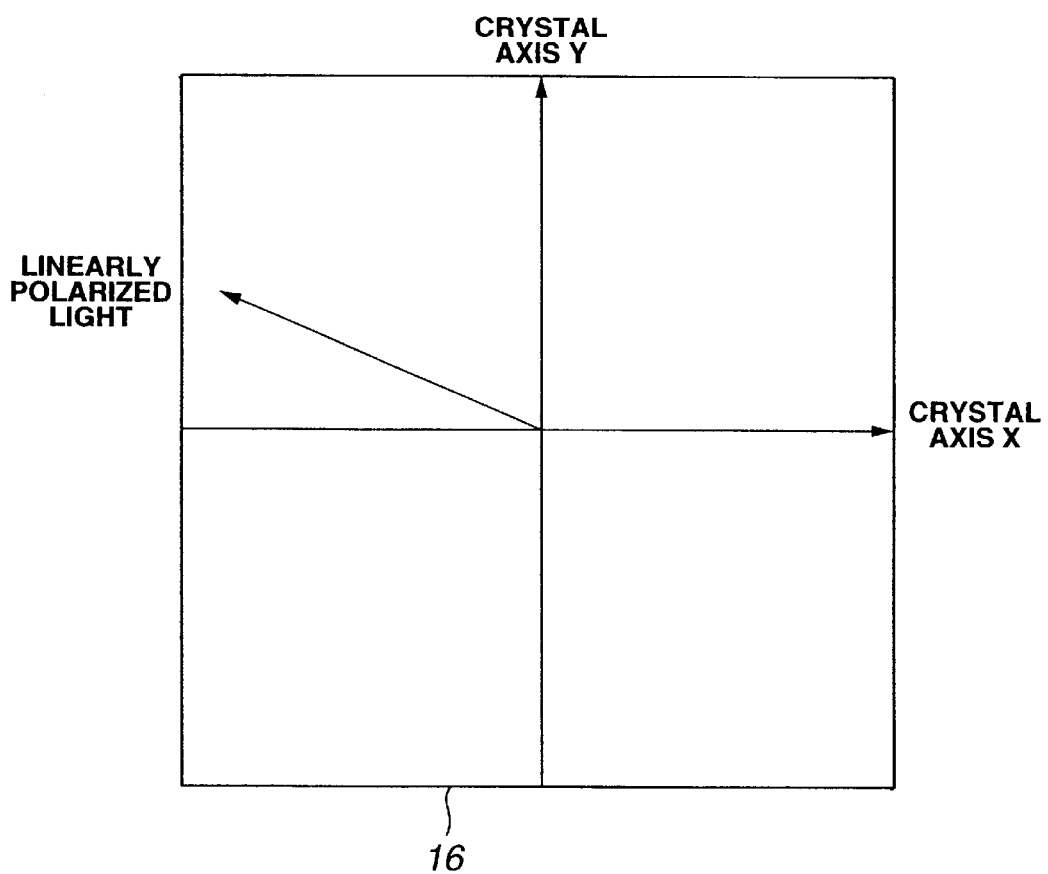
FIG. 13 is a schematic diagram of the polarized state of the return light from the magneto-optical disc at a position indicated with the arrow C in FIG. 8 as viewed from the traveling direction of the light.

The return light from the magneto-optical disc 7 has the plane of polarization rotated under the Kerr effect as shown in FIG. 12, and it is incident again upon the phase difference generator 16 while being in such a polarized state as shown in FIG. 13. Note that FIG. 13 shows the polarized state of the return light at a position indicated with the arrow C in FIG. 8 as viewed from the traveling direction of the return light.

Figure 14:
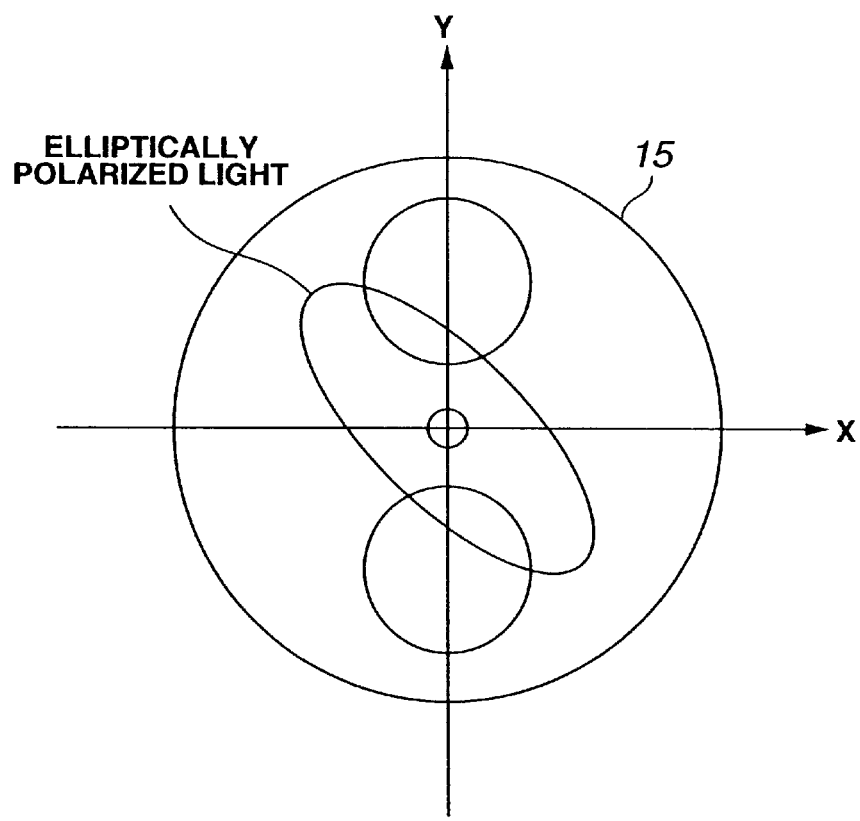
FIG. 14 is a schematic diagram of the polarized state of the return light from the magneto-optical disc at a position indicated with the arrow B in FIG. 8 as viewed from the traveling direction of the light.

The return light incident upon the phase difference generator 16 is elliptically or circularly polarized under the influence of the phase difference raised when the return light is passed through the phase difference generator 16. The return light passed through the phase difference generator 16 is incident again upon the polarization maintaining optical fiber 15 while being in the elliptically or circularly polarized state as shown in FIG. 14. Note that FIG. 14 shows the polarized state of the return light at the position indicated with the arrow B in FIG. 8 as viewed from the traveling direction of the return light.

Figure 15:
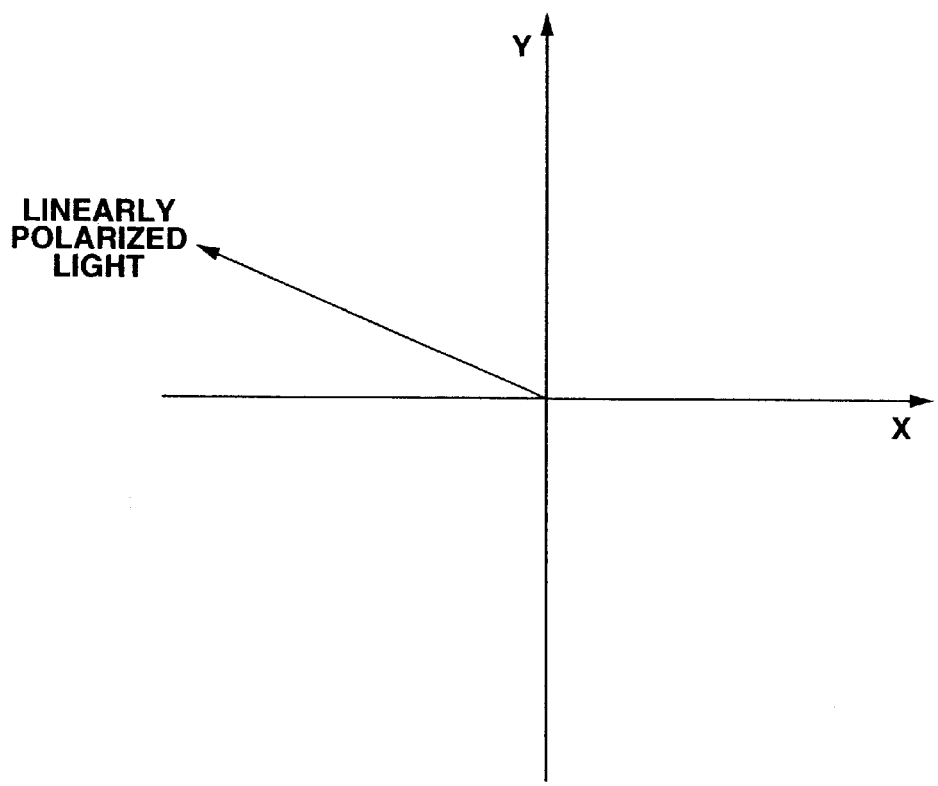
FIG. 15 is a schematic diagram of the polarized state of the return light from the magneto-optical disc at a position indicated with the arrow A in FIG. 8 as viewed from the traveling direction of the light.

The return light incident upon the polarization maintaining optical fiber 15 will be propagated through the latter. During the propagation, the return light will be rendered linearly polarized with the Kerr rotation angle being maintained under the influence of a phase difference raised due to the birefringence of the polarization maintaining optical fiber 15, and go out of the polarization maintaining optical fiber 15. Note that FIG. 15 shows the polarized state of the return light at the position indicated with the arrow A in FIG. 8 as viewed from the traveling direction of the return light.

Rendered linearly polarized with the Kerr rotation angle being maintained, the return light going out of the polarization maintaining optical fiber 15 is reflected by the beam splitter 13, then polarized and split by the polarization beam splitter 71, and received by the first and second photodetectors 72 and 73. Thus, magneto-optical signals will be detected.

The change in phase of field vibration components of the return light from the magneto-optical disc 7 will be explained below by the use of the Jones matrix.

Since the return light from the magneto-optical disc 7 is subjected to Kerr rotation, its polarized state is given by the following expression (8):

$$\text{return light subjected to Kerr rotation} \rightarrow \begin{pmatrix} \cos\theta & -\sin\theta \\ \sin\theta & \cos\theta \end{pmatrix}\begin{pmatrix} -1 \\ 1 \end{pmatrix} \quad (8)$$

where θ is the Kerr rotation angle.

The linearly polarized return light having been rotated through the Kerr rotation angle as shown by the expression (8) will be incident upon the phase difference generator 16. The change in phase of field vibration components by the phase difference generator 16 is given by the above expression (6). Also, the return light having passed through the phase difference generator 16 will be incident upon the polarization maintaining optical fiber 15. The change in phase difference between field vibration components due to the birefringence of the polarization maintaining optical fiber 15 is given by the above expression (5). Multiplication of the expressions (8), (6) and (5) will result in the following expression (9):

$$\begin{pmatrix} \text{Exp}\,i\frac{\Delta}{2} & 0 \\ 0 & \text{Exp}-i\frac{\Delta}{2} \end{pmatrix}\begin{pmatrix} \text{Exp}\,i\frac{-\Delta}{2} & 0 \\ 0 & \text{Exp}-i\frac{\Delta}{2} \end{pmatrix}\begin{pmatrix} \cos\theta & -\sin\theta \\ \sin\theta & \cos\theta \end{pmatrix} \quad (9)$$

$$\begin{pmatrix} -1 \\ 1 \end{pmatrix} \rightarrow \begin{pmatrix} -\cos\theta & -\sin\theta \\ -\sin\theta & +\cos\theta \end{pmatrix}$$

From the above expression (9), it is known that the return light having passed through the phase difference generator 16 and guided through the polarization maintaining optical fiber 15 towards the first and second photodetectors 72 and 73 is linearly polarized.

The polarized state of the return light having passed through the phase difference generator 16 and propagated through the polarization maintaining optical fiber 15, as viewed from the first and second photodetectors 72 and 73, is given by the following expression (10):

$$\begin{pmatrix} \cos\theta & +\sin\theta \\ -\sin\theta & +\cos\theta \end{pmatrix} \quad (10)$$

Decomposition of the above expression (10) will result in the following expression (11):

$$\begin{pmatrix} \cos(-\theta) & -\sin(-\theta) \\ \sin(-\theta) & \cos(-\theta) \end{pmatrix}\begin{pmatrix} 1 \\ 1 \end{pmatrix} \quad (11)$$

The above expression (11) means the polarization axis of the linearly polarized light emitted from the light source 11, rotated by −θ. That is, it is known that the Kerr rotation angle of the return light is maintained.

As having been described in the foregoing, the optical disc drive 1 according to the present invention is adapted such that a phase difference between field vibration components, raised when a light emitted from the light source 11 is propagated through the polarization maintaining optical fiber 15, and a one raised when a return light from a magneto-optical disc is propagated through the polarization maintaining optical fiber 15, are canceled by a phase difference produced by the phase difference generator 16 or multiplied by an integer multiple of π. Therefore, in this optical disc drive 1, a linearly polarized light emitted from the light source 11 is radiated to the magneto-optical disc 7 while being maintained linearly polarized, and a linearly polarized return light reflected by the magneto-optical disc 7 and whose polarization axis is rotated by a Kerr rotation angle is incident upon the first and second photodetectors 72 and 73 as a linearly polarized light maintaining the Kerr rotation angle, to properly detect magneto-optical signals from the magneto-optical disc 7.

Figure 16:
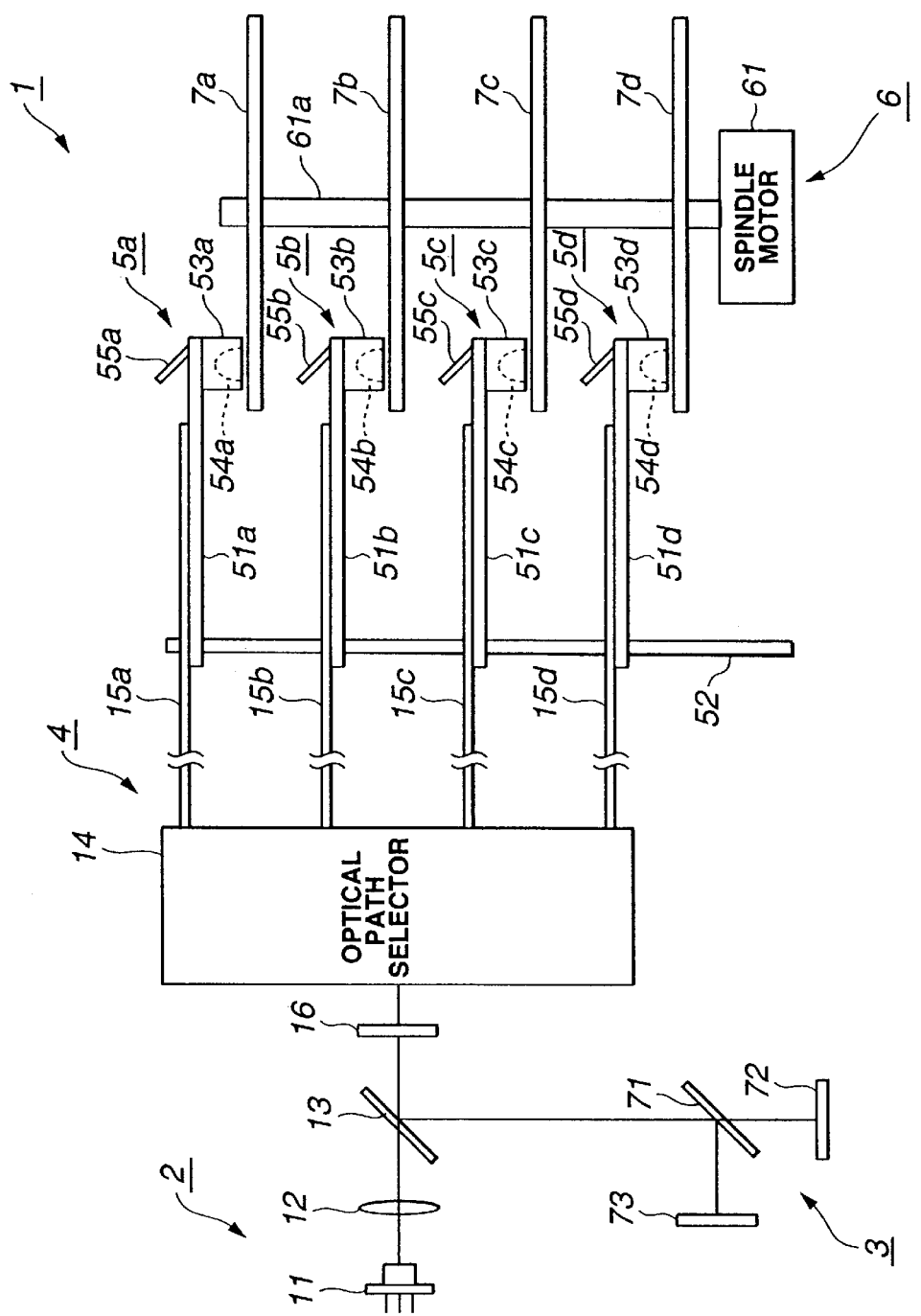
FIG. 16 shows another example construction of the optical disc drive shown in FIG. 1.

Note that in the foregoing, there has been described the embodiment of the optical disc drive 1 according to the present invention in which the four phase difference generators 16a, 16b, 16c and 16d are provided correspondingly to the four polarization maintaining optical fibers 15a, 15b, 15c and 15d, respectively but the optical disc drive 1 may be adapted such that a phase difference between field vibration components, raised in a light propagated through each of the polarization maintaining optical fibers 15a, 15b, 15c and 15d, can be canceled or multiplied by an integer multiple of π by the use of a single phase difference generator 16 as shown in FIG. 16. In the latter case, the phase difference generator 16 is to be disposed between the beam splitter 13 and optical path selector 14.

By canceling, or multiplying by an integer multiple of π, a phase difference between field vibration components, raised in a light propagated through each of the polarization maintaining optical fibers 15a, 15b, 15c and 15d, by the user of the phase difference generator 16, it will be possible to manufacture the optical disc drive 1 with a reduced number of parts and less costs. In this case, however, if there exists a variation in length and birefringent index among the polarization maintaining optical fibers 15a, 15b, 15c and 15d, it is necessary to adjust the retardation of the aforementioned phase difference generator 16 for each of the polarization maintaining optical fibers 15a, 15b, 15c and 15d.

Also, in the foregoing, there has been described the optical disc drive 1 in which the four magneto-optical discs 7a, 7b, 7c and 7d are installed and signals are written and/or read to and/or from a selected one of the four magneto-optical discs 7a, 7b, 7c and 7d. Of course, however, the present invention is not limited to the "four" magneto-optical discs 7 but according to the present invention, the optical disc drive 1 may be adapted to write and/or read signals to and/or from a single magneto-optical disc 7. In this case, the optical path selected 14 becomes unnecessary and there will be provided only a single polarization maintaining optical fiber 15, phase difference generator 16 and a single head 5 each.

Also, there has been described in the foregoing the optical disc drive 1 in which the magneto-optical discs 7a, 7b, 7c and 7d are installed on the spindle 61a of the spindle motor 61. However, the present invention is not limited to the above embodiment but can be applied to an optical disc drive in which the optical disc 7 is loadable in and removable from the drive unit, or a so-called disc-removable type optical disc drive.

Further, the present invention has been described in the foregoing concerning the optical disc drive 1 in which the magneto-optical discs are used as optical discs 7. In the present invention, however, the type of optical discs used in the optical disc drive 1 is not limited to the magneto-optical type but a pit-pattern disc represented by CD (compact disc) and phase-change disc represented by DVD-RAM (digital video disc-random access memory) may be used as the optical disc 7. Also in case a pit-pattern disc or phase-change disc is used as the optical disc 7 in the aforementioned optical disc drive 1, read signals can be obtained without any trouble based on a change in amount of the return light from the optical disc 7.

In case a plurality of optical discs 7 is used in the optical disc drive 1 as in the foregoing, the plurality of optical discs may include ones of the same type or difference types.

Industrial Applicability

In the optical disc drive according to the present invention, a phase difference between field vibration components, raised in a light traveling through the polarization maintaining optical fiber is canceled by a phase difference produced by the phase difference generator or multiplied by an integer multiple, of π, thereby permitting to properly detect magneto-optical signals. Therefore, the optical disc drive according to the present invention is compatible with all types of optical discs including a magneto-optical disc.

What is claimed is:

1. An optical disc drive comprising:

means for rotating an optical disc;

a light source to emit a light used for write and/or read of signals to and/or the optical disc;

a head having installed therein an objective lens which converges the light emitted from the light source and being scanned over the optical disc being rotated by the rotating means to radiate the light converged by the objective lens to the optical disc;

means for receiving a return light being a part of the light radiated from the head to the optical disc and which is reflected from the optical disc and detecting signals from the return light; and means for transmitting the light emitted from the light source to the head and the return light from the optical disc to the signal detecting means;

the light transmitting means including a polarization maintaining optical fiber and phase difference generating means to cancel out a phase difference between electric field vibration components generated when the light going towards the head or the return light going towards the signal detecting means is guided through the polarization maintaining optical fiber by the phase difference generated by the phase difference generating means or multiply the phase difference by an integer multiple of π.

2. The optical disc drive according to claim 1, wherein the phase difference generating means is a combination of a pair of wedge-shaped birefringent crystals whose crystal axes are perpendicular to each other.

3. The optical disc drive according to claim 1, wherein the optical disc is a magneto-optical disc.

4. An optical disc drive comprising:

means for rotating a plurality of optical discs together;

a light source which emits a light for use to write and/or read signals to the plurality of optical discs;

a plurality of heads provided correspondingly to the plurality of optical discs, each of which has installed thereon an objective lens to converge a light emitted from the light source and is canned over an appropriate optical disc being rotated by the disc rotating means to radiate the light converged by the objective lens to the optical disc;

means for receiving a return light being a part of the light radiated to the optical disc from a corresponding one of the plurality of heads to detect signals carried by the light; and means for transmitting the light emitted from the light source to each of the plurality of heads and the return light from the optical disc to the signal detecting means;

the light transmitting means includes a plurality of polarization maintaining optical fibers corresponding to the plurality of optical discs, optical path selecting means for making a selection between an optical path for the light emitted from the light source and a one for the return light going towards the signal detecting means, and means for generating a phase difference, a phase difference between field vibration components, having taken place when the light going towards the head or the return light going towards the signal detecting means goes through a one of the polarization maintaining optical fibers, selected by the optical path selecting means, being canceled out by a phase difference generated by the phase difference generating means or being multiplied by an integer multiple of $\pi$.

5. The optical disc drive according to claim 4, wherein a phase difference between field vibration components, raised in the light going towards the head or the return light going towards the signal detecting means when the path for the light or return light is changed from one to another by the optical path selecting means, is multiplied by an integer multiple of $\pi$.

6. The optical disc drive according to claim 4, wherein the phase difference generating means is a combination of a pair of wedge-shaped birefringent crystals whose crystal axes are perpendicular to each other.

7. The optical disc drive according to claim 4, wherein the phase difference generating means are installed on the plurality of heads, respectively.

8. The optical disc drive according to claim 4, where in the phase difference generating means is disposed between the optical path selecting means and the light source and signal detecting means.

9. The optical disc drive according to claim 4, wherein at least one of the plurality of optical discs is a magneto-optical disc.

* * * * *